United States Patent Office 3,392,144
Patented July 9, 1968

3,392,144
POLYAMIDE COMPOSITIONS AND POLYIMIDE-AMIDES THEREFROM
Fred F. Holub, Scotia, N.Y., assignor to General Electric Company, a corporation of New York
No Drawing. Filed May 15, 1967, Ser. No. 638,634
8 Claims. (Cl. 260—46.5)

ABSTRACT OF THE DISCLOSURE

Polyamides are prepared from the reaction of a phthaloyl compound with an organosilicon diamine, or with a mixture of the latter and an organic diamine free of silicon. The polyimide-amide products obtained by heat-treatment of the aforesaid reaction products are useful as heat-resistant protective and insulating members.

This invention is concerned with polyamide compositions which can be converted under the influence of heat to compositions containing both amide and imide linkages. More particularly, the invention relates to a composition selected from the class consisting of compositions of matter composed of (a) recurring structural units of the formula:

I 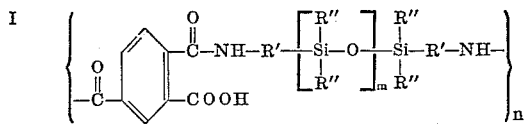

and (b) the latter structural unit combined with a recurring structural unit selected from the class consisting of (1) II
(2) III
(3) IV

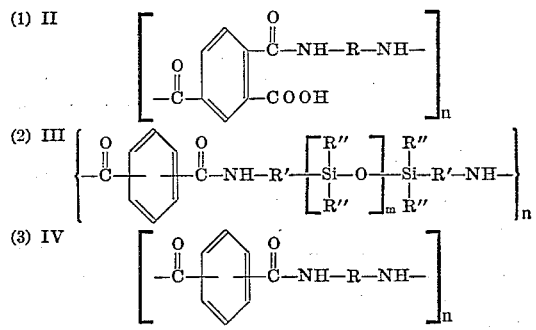

and (4) mixtures of (1), (2), and (3).

Upon heat treatment of these compositions, one obtains polyamide-imide resins composed either alone of (a) recurring structural units of the formula V 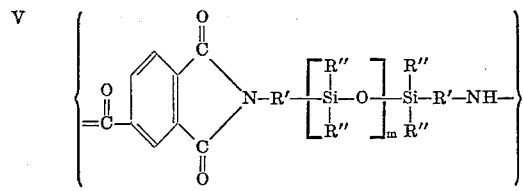

or resins composed both of units (a) and (b) recurring structural units of the formula VI 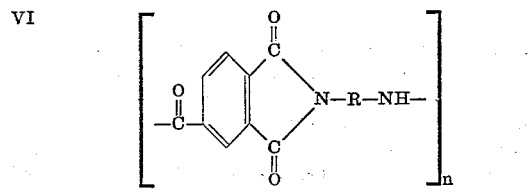

in combination with the aforesaid units of the Formulas III and IV, depending on the reactants employed. In the foregoing formulas, R is a divalent organic radical, R' is a divalent hydrocarbon radical, preferably an aliphatic radical, R" is a monovalent organic radical, $m$ is a whole number equal to at least zero, and advantageously from 1 to 50 or more, and $n$ is a whole number greater than one, for example, in excess of 10 up to about 10,000 or more and advantageously from 100 to 5000. The molecular weights of these polymers may range from about 5000 to two million or more when measured by usual methods, for instance, by light scattering.

U.S. Patent 3,260,691 describes the preparation of polyamide acid resins of the Formula II which, upon heating, are converted to polyimide resins composed of recurring structural units of Formula VI. Although these resins have good heat resistance and find utility in many applications where resistance to elevated temperature is a prime requisite, nevertheless, in high corona environments, these polyimides leave considerable room for improvement in their resistance to such corona.

Unexpectedly, I have discovered that the incorporation of structural units of Formula I in the polyamide resins of Formula II either alone or combined with other polyamide compositions of Formulas III and IV, one obtains, unexpectedly, greatly improved resistance of the polymers to corona after the latter are heated at the elevated temperatures required to cyclicize the polyamide acid structure to a polyimide structure.

The polymeric compositions described in this invention can be used in electrical insulation and in protective surface coatings, and for the formation of heat-resistant films. Solutions of these resins in the polyamide state can be used to coat electrical conductors such as copper, aluminum, alloys of copper and aluminum, etc., which can then be heated at temperatures ranging from 150° to as high as 450° C. to effect cyclization of the amide structure to give the polyimides alone or also containing amide linkages. Such solutions can also be used to cast films which can be then heated at the abovementioned elevated temperatures to give polyimide-amide films having use as slot liners for motors, as heat-resistant films for packaging, etc. Additionally, the polymeric compositions herein described can be used as structural adhesives and can also be formed into fibers or other molded products. In conjunction with other natural and synthetic resins such as phenol-aldehyde resins, silicones, etc., they find many uses for upgrading these latter resins. The corona resistance of other polyamide acid or polyimide resins can be improved by blending the latter with the compositions of the instant invention. The polyamide acid compositions can serve as overcoatings and undercoating to other resins such as polyvinylformal resins, polyesters, and the like. Because of the outstanding properties which these materials have and particularly their ease of application, stability and storage, heat-resistance, as well as dielectric resistance, and excellent adhesion of the cured products, many other applications will obviously be apparent. The polyamide acid resins can be electrocoated in the manner described in the copending application of Fred F. Holub, Ser. No. 548,000, filed May 5, 1966 and assigned to the same assignee as in the present invention.

Generally, in preparing the polyamide acids ultimately converted to the polyimide-amide compositions, one can form a mixture of ingredients comprising a phthaloyl halide of the formula

VII

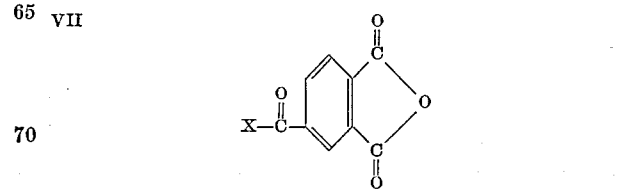

where X is a halogen (e.g., chlorine, bromine, etc.) and a diaminosiloxane of the formula

VIII

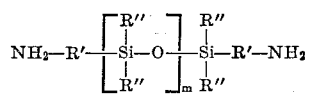

If desired, additional reactants required to give the combination of recurring structural units described above may also be added to the reaction mixture, for instance, a diamino compound of the formula

IX  $NH_2$—R—$NH_2$ and a phthaloyl compound of the formula

X

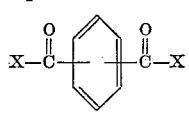

where R, R', R'', X and m have the meanings given above, and the phthaloyl compound of Formula X is restricted to the isophthaloyl and terephthaloyl halides, and mixtures of these phthaloyl halides. When both phthaloyl halides are used, it is preferred to employ the isophthaloyl halide in an amount ranging from 50 to 99 mole percent of the total molar concentration of the two phthaloyl halides.

The initial reaction between the ingredients can be carried out at from about room temperature to about 100° C. for times ranging from about 5 minutes to about 30 minutes or more up to the time required to give complete reaction to form a polyamide acid resin. Upon further heating at temperatures of about 150° to 350° C. or higher, the polymeric amide acid is cyclicized to yield imidized derivatives containing amide linkages more particularly described above.

Among the divalent radicals which R may be for instance, ethylene, trimethylene, isopropylidene

[—$(CH_3)C(CH_3)$—]

isobutylene, tetramethylene, pentamethylene, phenylene, tolylene, xylylene, biphenylene

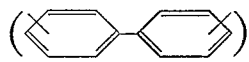

diphenylene methane (—$C_6H_4$—$CH_2$—$C_6H_4$—), diphenylene oxide

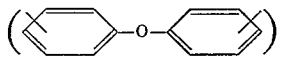

diphenylene sulfone, etc., with valences of the arylene radicals being ortho, meta, or para to each other or to connecting bonds between adjacent arylene radicals. R' may be any of the divalent aliphatic hydrocarbon radicals mentioned above for R.

Among the monovalent organic, e.g., hydrocarbon, radicals which R'' may be are, for instances, alkyl radicals (e.g., methyl, ethyl, propyl, butyl, isobutyl, decyl, etc.); aryl radicals (e.g., phenyl, naphthyl, biphenyl, etc.): alkaryl radicals (e.g., tolyl, xylyl, ethylphenyl, etc.): aralkyl radicals (e.g., benzyl, phenylethyl, etc.); alkenyl radicals (eg., vinyl, allyl, methallyl, etc.), cyanoalkyl radicals (e.g., cyanomethyl, cyanoethyl, cyanopropyl, etc.), etc.

The reaction between the diamino siloxane compound of Formula VIII (or with any additional diamino compound of Formula IX) and the anhydride of Formula VII, either alone, or combined with phthaloyl halide of Formula X, is advantageously carried out in a suitable solvent. Among such solvents may be mentioned, for example, dimethyl formamide, N-methyl-2-pyrrolidone, dimethyl acetamide, etc.

In general one employs approximately from 0.9 to 1.1 total moles of the diamino compound or mixture of diamino compounds per mole of anhydride of Formula VII alone or total moles of the latter combined with the phthaloyl halide of Formula X. Advantageously one can employ approximately equimolar concentrations of the diamines and the other reactant, i.e., the phthaloyl halide of Formula VII alone or combined with the phthaloyl halide of Formula X, if the latter is also employed. After interaction to form the polyamide acid composition, the solvent is advantageously removed and the resulting polymer heated at the elevated temperatures required to effect cyclization and formation of the imide structures shown in Formulas V and VI, with the concurrent presence of amide structures resulting from the use of the phthaloyl composition of Formula VII and the diacyl halide composition of Formula X.

Included among the phthaloyl halides that may be employed are, for instance, isophthaloyl chloride, terephthaloyl chloride, isophthaloyl bromide, etc.

Where mixtures of diamines are used, I have found that although the diamine of Formula VIII can be employed in positive concentrations ranging up to 98 mole percent of the total molar concentration of the two diamines of Formulas VIII and IX. Good results, as far as corona resistance is concerned, can be obtained when the molar concentration of the siloxane diamine of Formula VIII is present in amounts ranging from 2 to 25 mole percent of the total molar concentration of the latter diamine and the diamine of Formula IX.

In order that those skilled in the art may better understand how the present invention may be practiced, the following examples are given by way of illustration and not by way of limitation. All cut through tests were conducted in the manner described in U.S. 2,936,296. The corona tests (calculated on an equivalent thickness basis) were made according to ASTM D-2275-64T which specified the electrodes. The test chamber used was at 25° C. and contained $CaCl_2 \cdot 2H_2O$ to maintain the relative humidity between 17-20%. A voltage of 1200 volts was applied at 3160 Hz. (cycles/sec.)

EXAMPLE 1

To a reaction vessel flushed with nitrogen were charged 62.22 grams N,N-dimethylacetamide, 1.38 grams (0.005 mole) 1,3-bis(4-aminobutyl)1,1,3,3-tetramethyldisiloxane and 8.90 grams (0.045 mole) p,p'-methylenedianiline. The mixture was stirred and cooled to 6° C. at which point 10.5 grams (0.05 mole) 4-chloroformylphthalic anhydride was added. The stirring was continued for about two hours during which time the temperature rose to about 32° C. Methanol was then added to the stirred solution until it was cloudy and then the solution was precipitated by slow addition to about 500 ml. additional methanol. The resulting precipitate was washed three times with methanol, filtered and dried in vacuum at 50° C. for about four hours. This gave a polymeric composition composed of recurring structural units of the formula

XI

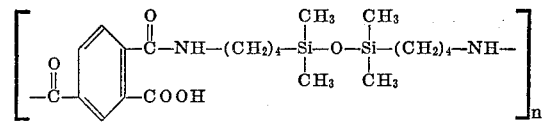

and

XII

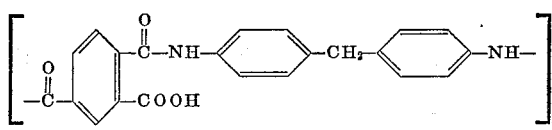

where n is a whole number greater than 1. A 25% solids solution of the above polyamide acid dissolved in N,N-dimethylacetamide was cast in the form of a film on an aluminum substrate and the film was slowly heated under nitrogen to 200° C. where the temperature was maintained for 1 hour. A clear, flexible film was obtained which had a cut-through temperature of 260° C. The corona resistance of the above film was found to be exceptionally high when tested under the condition recited previously. The finally heat-treated film described above was a polyimide composed of recurring structural units

XIII

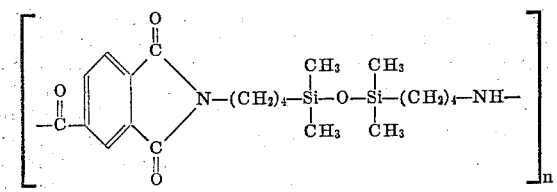

and

XIV

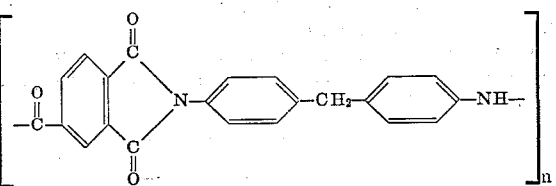

where $n$ has the meanings given above.

EXAMPLE 2

This example compares the corona properties of a film comprising a polyamide, polyimide structure which did not use the siloxane diamine of Example 1. More particularly, a polyamide acid resin was prepared by forming a mixture similarly as in Example 1 of 9.93 grams (0.05 mole) p,p'-methylene dianiline in 61.4 grams of N,N-dimethyl acetamide. The mixture was stirred and cooled to 4° C. at which time 10.5 grams (0.05 mole) 4-chloroformyl phthalic anhydride was added. After addition, the mixture was stirred for about one hour during which time the temperature rose to about 27° C. The polyamide acid resin was isolated similarly as in Example 1 and then formed into a solution by dissolving 5 grams of the polyamide acid resin in 15 grams N-methyl pyrrolidone. This 25% solids solution was then used to cast a film on a substrate which was thereafter heated for 1 hour at 100° C., 1 hour at 150° C., 1 hour at 200° C., and 15 minutes at 250° C. The polyamideimide film thus obtained had a corona resistance of about one-half the corona resistance of the film of Example 1.

EXAMPLE 3

A polyamide acid resin was prepared by charging to a reaction vessel flushed with nitrogen, 66.8 grams N,N-dimethylacetamide, 1.38 grams (0.005 mole) 1,3-bis(4-aminobutyl) 1,1,3,3-tetramethyldisiloxane and 4.85 grams (0.045 mole) m-phenylenediamine. The mixture was stirred and cooled to 4° C. at which time 10.5 grams (0.05 mole) 4-chloroformylphthalic anhydride was added. Stirring was continued for about two hours during which time the temperautre rose to about 27° C. The solution was then precipitated in the same manner as employed in Example 1 to give a polyamide acid resin composed of recurring structural units of Formula XI and

XV

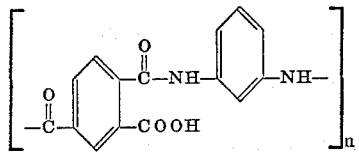

where $n$ has the meaning above. A 25% solids solution of the above polyamide acid was prepared similarly as in Example 1 using dimethylacetamide as the solvent. A portion of the solution was cast on an aluminum substrate and the film was slowly cured under nitrogen at 200° C. for about 1 hour. A clear, self-supporting film was obtained having a cut-through temperature of 247° C. This polyimideamide, which was composed of recurring structural units of Formula XIII and recurring structural units of the formula

XVI

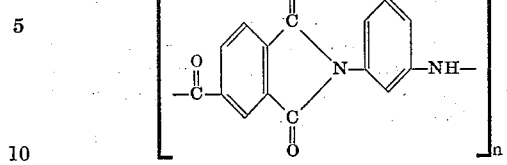

where $n$ is a whole number in excess of 1, had a corona resistance about seven times the corona resistance of a polyimideamide resin film prepared similarly as above but omitting the disiloxanediamine.

EXAMPLE 4

To a reaction vessel were charged, under nitrogen, 33.84 grams N,N-dimethylacetamide, 1.1 grams (0.004 mole) 1,3-bis(4-aminobutyl)1,1,3,3-tetramethyldisiloxane, 3.16 grams (0.016 mole) p,p'-methylenedianiline, and 1.6 grams pyridine. While stirring the mixture, 4.2 grams (0.02 mole) 4-chloroformylphthalic anhydride was added. The temperature rose to about 72° C. and then receded. The mixture was stirred for 15 hours at about 50° C. After isolating the polyamide acid resin in the manner described in Example 1, a 15% solids solution in dimethyl acetamide was prepared and a film cast on an aluminum substrate. This film was heated for about 1 hour under nitrogen at 230° C. to give the polyamideimide polymer of the type described in Example 1. The clear, flexible film thus obtained had a cut-through temperature of 245° C. and a corona resistance more than 25 times greater than the corona resistance of the polyamideimide of Example 2.

EXAMPLE 5

A polyamideimide resin having good corona resistance and containing initial recurring structural units coming within generic Formulas I, II, III, and IV was prepared by effecting reaction under nitrogen between 84.36 grams N,N-dimethylacetamide, 2.76 grams (0.01 mole) 1,3-bis (4-aminobutyl) 1,1,3,3-tetramethyldisiloxane, 7.92 grams (0.04 mole) p,p'-methylene dianiline, and 7.9 grams pyridine. The mixture was stirred and cooled to about 5 to 10° C. at which time about 7.88 grams (0.0375 mole) 4-chloroformylphthalic anhydride and 2.53 grams (0.0125 mole) isophthaloyl chloride were added. The mixture was stirred for about 2 hours during which time the temperature rose to about 65° C., and the polymer was then precipitated in the same manner as described above in the preceding examples. The polyamide acid resin thus obtained, in the form of a 25% solids solution in dimethyl acetamide, was cast on an aluminum substrate in the manner described in Examples 1 to 4, heated at about 240° C. for one hour to give a polyamideimide film which had a cut-through temperature of about 230° C. This polyamideimide was composed of recurring units of Formulas XIII, XIV and recurring structural units of the formulas

XVII

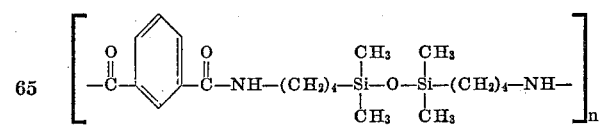

and

XVIII

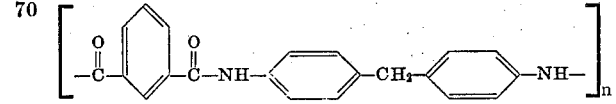

where $n$ is a whole number in excess of 1.

EXAMPLES 6-10

In these examples polyimideamides were prepared and cast into films in the same manner as described in the preceding examples employing various phthaloyl halides and various diamines for the purpose. The following table shows the molar concentrations of the ingredients used to make these polyimideamides together with the cut-through temperatures of the cured films deposited in each instance of an aluminum substrate.

TABLE 1

| Ex. No. | Mole Ratio of Ingredients | | | | | Cut Through Temp., °C. |
|---|---|---|---|---|---|---|
| | CFPA | IPC | SDA | MDA | MPDA | |
| 6 | 0.9 | 0.1 | 0.1 | | 0.9 | 210 |
| 7 [2] | 0.9 | 0.1 | 0.1 | 0.9 | | 260 |
| 8 | 0.25 | 0.75 | 0.1 | 0.9 | | 270 |
| 9 | 0.25 | 0.75 | 0.2 | 0.8 | | 250 |
| 10 | 1.0 | | 1.0 | | | ([3]) |

[1] Abbreviations in table signify the following.—CFPA =4-chloroformyl phthalic anhydride; IPC =Isophthaloyl chloride; SDA =1,3, bis(4-aminobutyl)-1,1,3,3-tetramethyldisiloxane; MDA =p,p'-Methylene dianiline; MPDA =Meta-phenylene diamine.
[2] The corona resistance of this polyamideimide was about 2.4 times better than a similar film made as in Example 7 but omitting the SDA.
[3] Rubbery film.

It will be apparent to those skilled in the art that other diamino compounds free of silicon and other silicon-containing diamino compounds may be employed in conjunction with the reactions described above. Included among the diamino compounds free of silicon which can be used are, for instance, m-phenylene diamine, p-phenylene diamine, methylene dianiline, 4,4'-diaminodiphenyl oxide, 4,4'-diaminodiphenyl sulfone, hexamethylene diamine, etc.

In place of the diaminodisiloxane employed in the foregoing examples, other diaminopolysiloxanes may be employed as, for instance,

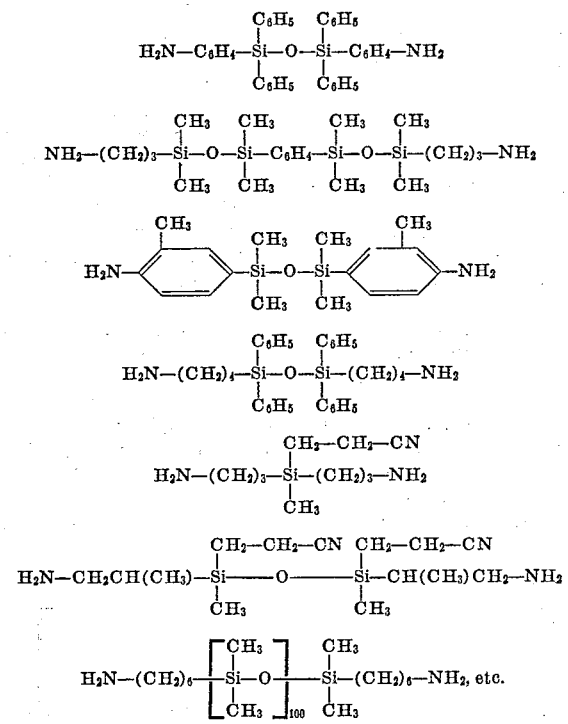

Many other organopolysiloxanes containing at least two amino groups attached to silicon by the medium of a carbon atom may also be used in the reaction with the other ingredients. Among these may be mentioned organopolysiloxanes corresponding to the formula

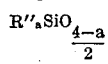

in which R" is an organic radical, for instance, ethyl, propyl, butyl, hexyl, isobutyl, vinyl, phenyl, etc., wherein at least two of the R" groups are substituted with an —NH$_2$ group and $a$ has a value from 1 to 3, inclusive. These aminopolysiloxanes can be prepared by reducing with hydrogen the corresponding cyano-organopolysiloxane employing as the cyano-organopolysiloxane for the purpose those polymeric and monomeric compounds and methods for preparing those compounds disclosed and claimed in U.S. Patents 3,185,663 and 3,185,719, both issued May 25, 1966, and assigned to the same assignee as the present invention. Additional directions for making the cyanoalkyl polysiloxanes which can be converted to amino alkyl polysiloxanes can be found in British Patent 786,020, published Nov. 6, 1957.

What I claim as new and desire to secure by Letters Patent of the United States is:

1. A composition of matter selected from the class consisting of (1) polymers composed of recurring structural units of the formula

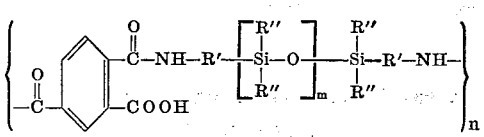

and (2) compositions composed of recurring structural units of (1) in combination with a structural unit selected from the class consisting of (a)
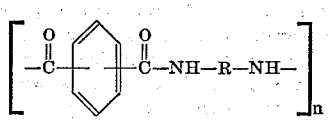

(b)
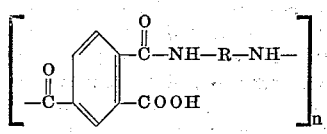

(c)
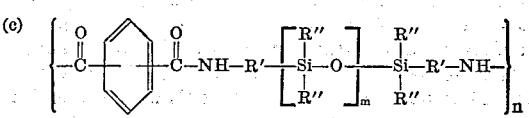

and (d) mixtures of (a), (b), and (c), where R is a divalent organic radical, R' is a divalent hydrocarbon radical, R" is a monovalent organic radical, $m$ is a whole number equal to at least 0, and $n$ is a whole number greater than 1.

2. A composition of matter composed of recurring structural units of the formula (a)

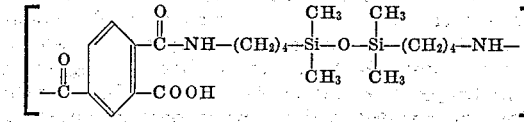

and (b)

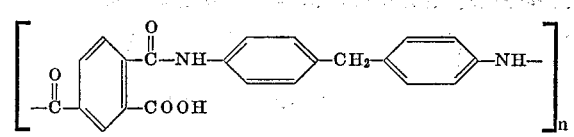

where $n$ is a whole number in excess of 1.

3. A composition of matter composed of recurring structural units of the formula (a)

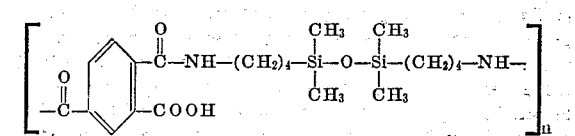

and (b)

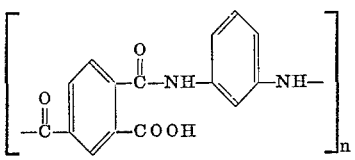

where *n* is a whole number in excess of 1.

4. A composition of matter composed of recurring structural units of the formulas (a)

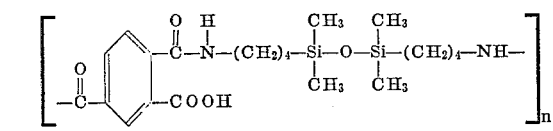

(b)

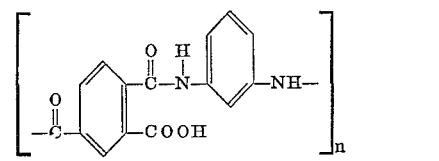

(c)

and (d)

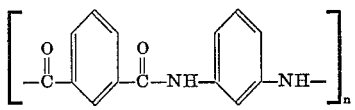

where *n* is a whole number in excess of 1.

5. A polyamideimide composition formed by the heat treatment at 150 to 450° C. of the composition of claim 1.
6. A polyamideimide composition formed by the heat treatment at 150 to 450° C. of the composition in claim 2.
7. A polyamideimide composition formed by the heat treatment at 150 to 450° C. of the composition in claim 3.
8. A polyamideimide composition formed by the heat treatment at 150 to 450° C. of the composition in claim 4.

References Cited

UNITED STATES PATENTS 3,260,691  7/1966  Lavin et al. _____ 260—78
3,274,155  9/1966  Saunders et al. _____ 260—448.2

DONALD E. CZAJA, *Primary Examiner.*

J. A. SEIDLECK, *Examiner.*

M. I. MARQUIS, *Assistant Examiner.*